UNITED STATES PATENT OFFICE 2,260,152

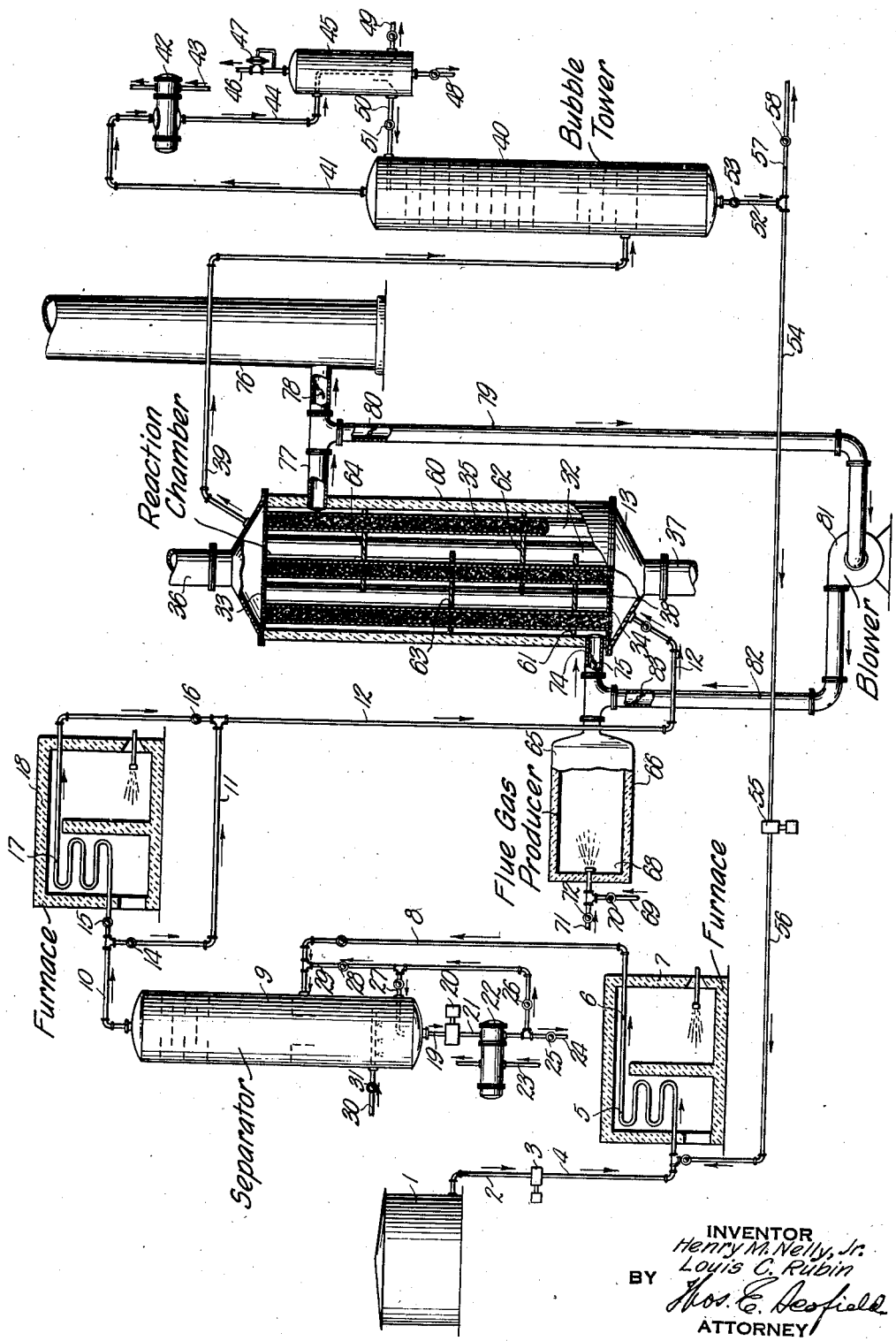

METHOD FOR CONTROLLING HEAT IN CATALYTIC REACTIONS

Henry M. Nelly, Jr., Jersey City, and Louis C. Rubin, West Caldwell, N. J., assignors to The M. W. Kellogg Company, New York, N. Y., a corporation of Delaware Application June 16, 1938, Serial No. 214,018

2 Claims. (Cl. 196—51)

Our invention relates to a method for controlling heat in catalytic reactions, and more particularly to supplying heat in endothermic catalytic reactions or removing heat in exothermic catalytic reactions.

In a catalytic reaction in which reactants interact in the presence of a catalyst, the reaction proceeds initially at a very rapid rate and retards as equilibrium is reached. Actually, the reaction is never completed commercially, due to the slow rate at which it proceeds as it reaches completion. We have observed that the rate of the reaction is not a linear function, but proceeds rapidly initially and then progressively decreases to a point where the rate of reaction is very small.

If the reaction is endothermic, its velocity is reflected by a loss of heat at a rate which is a function of the velocity of the reaction.

For purposes of clarity and by way of illustration, we will describe our invention with respect to the catalytic pyrolysis of high boiling hydrocarbons to low boiling hydrocarbons, that is, with respect to catalytic cracking which is an endothermic reaction, though it is to be understood, of course, that our invention is applicable to catalytic reactions generally.

In a method of catalytic cracking, oil vapors are heated to the cracking temperature and, when the heated vapors contact the catalyst, decomposition proceeds. As the reaction proceeds, if no heat is supplied, the temperature of the reactant hydrocarbons drops, with the result that the reaction will proceed less rapidly until a temperature is reached at which substantially no cracking will take place. Then, too, variations in temperature result not only in variations in yields but the resultant decomposition products will vary in their composition.

One object of our invention is to provide a method for controlling heat in catalytic reactions.

Another object of our invention is to provide a method for controlling heat in endothermic catalytic reactions and in that connection to supply superheat to the reactant oil vapors and utilizing this excess sensible heat to furnish part of the endothermic heat of reaction during the initial cracking period where the rate of cracking and heat absorption proceeds rapidly and where heat addition by indirect means is difficult.

Another object of our invention is to provide a novel method for the catalytic conversion of high boiling hydrocarbons into lower boiling hydrocarbons.

Another object of our invention is to provide a continuous method of cracking hydrocarbons with the aid of a catalyst, in such a manner as to provide maximum yields of uniform products.

Other and further objects of our invention will appear from the following description.

In the accompanying drawing which forms part of the instant specification and is to be read in conjunction therewith, the figure illustrates a diagrammatic view of one form of apparatus capable of carrying out the method of our invention.

Referring now to the drawing, hydrocarbon oil to be cracked is stored in tank 1 from which it is withdrawn through pipe 2 and pumped by pump 3 through pipe 4 through coil 5, heated by convection heat, and coil 6 heated by radiant heat, and positioned in a furnace 7. The oil is heated to vaporizing temperatures and is passed through transfer pipe 8 into a separating tower 9 in which the heated oil is flashed into vapors and unvaporized oil. If the transfer temperature is at the desired cracking temperature, which may be between 800° F. and 950° F. or higher, and enough superheat has been supplied, the hot vapors withdrawn from the separator 9 through pipe 10 pass through pipe 11 and pipe 12 to a catalytic reaction chamber 13. If the vapors are not sufficiently heated, valve 14 may be closed, in whole or in part, and valves 15 and 16 opened so that the vapors may pass through pipe coil 17 situated in furnace 18, to be heated to the desired temperature.

The unvaporized oil is withdrawn from the separator 9 through pipe 19 and is pumped by pump 20 through pipe 21, through a heat exchanger 22 which is supplied a cooling medium, through pipe 23. All or a portion of the cooled oil may be withdrawn through pipe 24 which is controlled by valve 25. If desired, valve 26 may be opened, permitting the cooled oil to pass into the separator 9 through pipe 27 as a fluxing medium. Valve 28 controls the passage of cooled oil through pipe 29 which discharges into the transfer line 8 enabling a control of the temperature of the oil passing into the separator 9 to be easily made. If desired, steam may be introduced into the separating tower through pipe 30 controlled by valve 31 to assist in the separation of the vapors from the unvaporized oil. The reaction chamber may comprise a plurality of tubes 32 extending between an upper tube sheet 33 and a lower tube sheet 34. The tubes are filled with finely divided catalyst 35 which may be of any suitable type. A pipe 36 is provided for continuously feeding catalyst to the tubes 35. If desired, a spent catalytic material may be continuously withdrawn from the tubes through pipe 37, it being understood, of course, that if a continuous catalyst replacing operation is employed, the screen 38, holding the catalytic material in the tubes is not used. If, on the other hand, stationary columns of catalytic material are employed, pipes 36 and 37 are closed by suitable valves (not shown). The heated oil vapors introduced into the reaction chamber 13 through pipe 12 rise upwardly through the tubes 32 in contact with the catalytic material and the reaction products are withdrawn from the upper end of the chamber 13 through a pipe 39 and introduced into a fractionating tower 40 which may be of the bubble tray type. The vapors and noncondensable gases are withdrawn from the fractionating tower through pipe 41 and pass through a condenser 42 which is supplied with cooling medium through a pipe 43. The condensate and noncondensable gases are withdrawn from condenser 42 through a pipe 44 and pass into a separator 45 from which the noncondensable gases are vented through pipe 46 controlled by back pressure controlled valve 47. Water is withdrawn from the separator through pipe 48. The final product is withdrawn from the separator through pipe 49. Reflux passes through pipe 50 controlled by valve 51 into the fractionating tower 40 to control the top tower temperature. Reflux condensate from the bottom of the tower is withdrawn therefrom through pipe 52, controlled by valve 53. A portion or all of the reflux condensate may be recycled through pipe 54, being pumped by pump 55 through pipe 56 into the oil passing to the furnace 7. A portion or all of the reflux condensate may be withdrawn through pipe 57 controlled by valve 58.

It will be observed that a portion of the heat of cracking is supplied through the hot oil vapors entering the reaction chamber. In the lower portion of the reaction tubes 32, that is, when the hot oil vapors first contact the catalytic material, the reaction will proceed with the greatest rapidity and, if no heat be supplied, the speed of the reaction will decrease more rapidly. In accordance with the objects of our invention, we propose to supply a portion of the endothermic heat of reaction as superheat in the oil vapors and a portion by an indirect heat exchange medium in such manner and at such a rate equal to the absorption of heat due to the reaction. It will be obvious from what has been said hereinbefore that this rate must be a varying one and that heat must be supplied more rapidly during the first portion of the reaction tubes than at the latter portion of the reaction tubes. We accomplish this result by providing an elongated path of flow for the heat exchange medium, the heat exchange medium flowing concurrently with the flow of the oil vapors and across the tubes in such a manner that the velocity of flow of the heat exchange medium is progressively decreasing.

Referring now to the drawing, it will be observed that the tubes 32 of the reaction chamber 13 are surrounded by a casing 60 of refractory material and that the space within the casing is divided by a plurality of baffles 61, 62, 63, and 64 to provide an elongated path for a heat exchange medium. It will be further observed that the spacing of the baffles is not uniform but that the space between the tube sheet 34 and the baffle 61 is less than the space between the baffle 61 and the baffle 62, which space, in turn, is less than that between baffle 62 and baffle 63, which likewise is less than that between baffle 63 and baffle 64 and the upper tube sheet 33. The heat exchange medium may be any suitable medium. For convenience, we prefer to use hot flue gases which are produced in a flue gas producer 65 which comprises a chamber having refractory walls 66. The chamber 68 is a mixing chamber into which is introduced fuel through pipe 69 controlled by valve 70, and air through pipe 71 controlled by valve 72, the proportions of air and gas being such as to form a combustible mixture having the desired temperature when burned at the outlet of the producer 66. This flue gas at high temperature which is passed to the reaction chamber through duct 74 is controlled by a damper 75. The upper end of the chamber 13 is connected to a stack 76 through a duct 77, the passage of gases to the stack being controlled by a damper 78. If desired, force draft may be employed by positioning an exhaust or discharge fan at the point occupied by damper 78, it being understood that the stack and damper are the equivalent of force draft means. To control the temperature and indirect heat transfer rate, a portion of the flue gases which have passed through chamber 13 may be recycled through duct 79 and passed by blower 81 through duct 82 into duct 74, the amount of recirculation being controlled by the speed of the blower and dampers 80 and 83.

It will be observed that the direction of flow of the heating medium and its velocity of flow is such that a maximum amount of heat is supplied during the first pass of the heat exchange medium. In other words, while the heat exchange medium is flowing between the tube sheet 34 and the baffle 61, it is at the greatest temperature and is traveling with the greatest velocity. Between baffle 61 and baffle 62 the temperature is somewhat reduced and the velocity is somewhat reduced. However, the reaction is proceeding in that portion of the tubes embraced by these baffles at a rate which is less than that in the first portion of the reaction tubes 32. Similarly, the heat exchange medium will be flowing at a still lower velocity and at still lower temperature between baffle 63 and baffle 62 but, in this portion of the reaction tubes 32, the reaction velocity and hence the endothermic heat, is correspondingly lower. The arrangement is such that the endothermic heat of reaction is constantly being supplied at a rate substantially equivalent to the rate of the reaction. Thus, the temperature of the vapors is maintained at the desired reaction temperature throughout their passage in contact with the catalytic material since the endothermic heat of the reaction is being supplied as fast as required. Before designing apparatus capable of carrying out the method of our invention, we plotted curves of the volume of gasoline produced against a time factor, and curves of heat density (B. t. u. per hour per square foot) against distance from the bottom of a reaction tube, from which we were able to plot curves of heat of reaction to be supplied against reactor tube length.

By way of illustration and not by way of limitation, in an apparatus capable of handling 500 barrels per day of gas oil (35.4° A. P. I.) employing a catalyst comprising alumina on a silica support and in which the reaction temperature was 850° F., the charging stock was such that a portion of the endothermic heat of the reaction could be supplied by superheating the feed vapors 30°. In other words, the furnace 18 was employed to impart to the vapors a temperature of 880° F. The first pass of the reaction chamber, that is between baffle 61 and tube sheet 34 had to supply 437,000 B. t. u. per hour which, for the design employed was 2025 B. t. u. per hour per square foot of heat exchange surface. In a reaction chamber measuring twenty feet between tube sheets, the first baffle 61 was placed two feet above the lower tube sheet 34. The second pass had to supply 258,000 B. t. u. per hour or heat at a rate of 900 B. t. u. per hour per square foot of heating surface. To accomplish this, the baffle 62 was placed three feet above the baffle 61

The next pass had to supply 160,000 B. t. u. per hour which, for the design employed and the operating conditions, was calculated to be 460 B. t. u. per hour per square foot of heating surface. This was obtained by placing the baffle 63 four feet from baffle 62. The next pass, that is between baffle 64 and baffle 63 had to supply 95,000 B. t. u. per hour or heat at a rate of 253 B. t. u. per hour per square foot of heating surface for the operating conditions. This was obtained by placing the baffle 64 five feet above baffle 63.

The sixth pass, that is, between the tube sheet 33 and the baffle 64 had to supply 70,000 B. t. u. per hour which, under the operating conditions and the design employed, was calculated to be 145 B. t. u. per hour per square foot of heating surface. This was obtained by placing the baffle 64 six feet below the tube sheet 33. It will be observed that six feet plus five feet plus four feet plus three feet plus two feet equal twenty feet, which is the distance between tube sheet 34 and tube sheet 33.

From the curves, the required rates of heat exchange for the six passes were as follows: 2015 B. t. u. per hour per square foot of heating surface, 758 B. t. u. per hour per square foot of heating surface, 352 B. t. u. per hour per square foot of heating surface, 167 B. t. u. per hour per square foot of heating surface, and 103 B. t. u. per hour per square foot of heating surface respectively.

It will be seen that these are fairly close to the calculated rates of 2025 B. t. u. per hour per square foot of heating surface, 900 B. t. u. per hour per square foot of heating surface, 460 B. t. u. per hour per square foot of heating surface, 253 B. t. u. per hour per square foot of heating surface, and 145 B. t. u. per hour per square foot of heating surface, respectively.

An operation in accordance with our invention was able to crack oil continuously in such manner that the endothermic heat of the reaction was substantially supplied by the heat exchange medium. It will be apparent to those skilled in the art that minor discrepancies in the rate of supplying the endothermic heat of reaction can be readily corrected by the variation in the temperature of the oil being charged to the reaction zone between certain limits. If the rate of heat exchange is too great, the oil being charged may be somewhat below the desired cracking temperature. If the rate of heat exchange be somewhat less than that necessary to supply the endothermic heat of reaction, the oil vapors may be superheated. The temperature of the heat exchange medium may be readily controlled by recycling flue gases and the rate of heat exchange may be also controlled by means of valves 72 and 70, it being understood of course that the air and the gas supplied to pipes 69 and 71 are under pressure.

It will be seen that we have accomplished the objects of our invention. We have provided a method of conducting a catalytic reaction in which the endothermic heat of the reaction is supplied at a rate substantially equal to the velocity of the reaction in such a manner that the reactant passes through the reaction zone at a substantially constant temperature, resulting in maximum yields of a uniform product.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A method of converting high-boiling hydrocarbons to lower boiling hydrocarbons which comprises passing the high-boiling hydrocarbons in the vapor phase and at an elevated temperature in a plurality of confined paths through a reaction zone comprising a plurality of aligned, columnar masses of a cracking catalyst under reaction conditions adapted to effect the desired conversion, passing a stream of a heat-exchange medium in heat-exchange relation with the reaction zone in a winding confined path traversing and retraversing said columnar masses and progressively increasing the cross-sectional area of said stream thereby progressively decreasing the velocity of flow thereof, the progressive increase in cross-sectional area being effected in a direction and being of a magnitude adapted to maintain the reaction zone at a proximate optimum temperature.

2. A method of converting high-boiling hydrocarbons to lower boiling hydrocarbons which comprises passing the high-boiling hydrocarbons in the vapor phase and at an elevated temperature in a plurality of confined paths through a reaction zone comprising a plurality of aligned, columnar masses of a cracking catalyst under reaction conditions adapted to effect the desired conversion, passing a stream of a heat-exchange medium in heat-exchange relation with the reaction zone in a winding confined path traversing and retraversing said columnar masses, said hydrocarbon vapors and heat-exchange medium being introduced at the same end of said reaction zone and withdrawn at the opposite end thereof, and the cross-sectional area of said stream of heat-exchange medium being progressively increased in the direction of movement of said stream.

HENRY M. NELLY, Jr.
LOUIS C. RUBIN.